Patented May 2, 1939

2,156,927

UNITED STATES PATENT OFFICE 2,156,927

ZEIN COMPOSITION

Oswald Sturken, Closter, N. J., assignor, by mesne assignments, to Corn Products Refining Company, New York, N. Y., a corporation of New Jersey No Drawing. Application September 23, 1935, Serial No. 41,766. Renewed December 8, 1937

3 Claims. (Cl. 134—23.8)

My invention relates to improvements in protein adhesives and, more specifically, to a protein adhesive having improved water resistance and increased working time.

In the past, certain proteins, and particularly casein, have been employed as adhesives in the wood-working art and in various other uses. However, the materials thus far utilized have had various disadvantages from a practical standpoint. In order to secure satisfactory water resistance, it has been necessary to employ relatively large amounts of alkaline materials in conjunction with the protein. These alkaline materials, however, cause staining of light woods or other light colored materials, and give rise to undesirable reactions, such as hydrolysis of the protein, which result in a relatively short working life for the adhesive. For example, a casein glue, after admixture with water, constantly changes in chemical nature so that a freshly prepared solution and an old solution will not give identical results. Likewise, such solutions will usually be found to gel in from 6-8 hours and will thicken considerably in less time. It has been attempted to secure the desired water resistance in casein glues by means of methylene compounds such as formaldehyde, but such attempts have resulted in a working time so short as to be entirely impractical (cf. Sutermeister, "Casein and its industrial applications", page 195; Chemical Catalog Co., New York, 1927). Various other attempts to secure the desired water resistance without unduly decreasing the working time have likewise met with failure.

I have now made the unexpected discovery that certain methylene compounds may be incorporated with alcoholic solutions of zein, in amounts sufficient to give excellent water-resistance, and that the resulting adhesives will generally have a working time of at least 24 hours. I have found that relatively large amounts of free formaldehyde may be employed in this manner and that increasing the concentration up to 50% of the weight of the zein will not appreciably decrease the working time of the adhesives. By the term "formaldehyde", as used herein, is intended not only free formaldehyde but formaldehyde solutions or compounds which liberate formaldehyhe under the conditions herein specified. Films deposited by adhesives of this type have excellent strength and are extremely water-resistant when fully cured. Further advantages of the adhesives of my present invention will be apparent from the following description.

For the preparation of my adhesives, any suitable alcoholic zein solutions may be employed, as for example, solutions obtained by the process of copending application Ser. No. 20,402 of L. C. Swallen, filed May 8, 1935. The adhesives may be prepared from such alcoholic solutions simply by adding the desired amount of aqueous formaldehyde. I have found that approximately 2% of free formaldehyde, based on the weight of the zein, is required to effect a full cure. Considerably larger amounts may be advantageous for certain purposes and amounts up to 50% of the weight of the zein will not adversely affect the product or appreciably decrease its working time. Commercial 40% aqueous formaldehyde may be employed if the zein is dissolved in relatively strong alcohol and if extremely large amounts of formaldehyde are not employed. On the other hand, if it is desired to utilize relatively large amounts of formaldehyde or if the zein is dissolved in relatively weak alcohol, e. g., 70%, it may be necessary to employ alcoholic solutions of formaldehyde in order to avoid precipitation of the zein. The final concentration of alcohol in the adhesive should be at least 70% in order to maintain the zein in solution. However, from the standpoint of preventing the formation of insoluble gels, the water content should be maintained as low as possible. For this reason I prefer to dissolve the zein in 95% alcohol and after solution has been effected, add thereto the required amount of aqueous 40% formaldehyde. A greater length of time and more agitation are usually required to complete the solution of the zein in the stronger alcohol but more stable solutions are obtained and any gels that may be formed after standing are readily redissolved by stirring or by the addition of a small proportion of alcohol.

The concentration of the zein in the solution may be varied to any desired extent, depending on the use of the solution; but in most cases the concentration of zein will be between 20% and 35%, by weight of the solution.

In utilizing my adhesives the usual procedures and the usual forms of apparatus may be employed. For example, the adhesives may be applied by brush, by rollers or by scraping knives. Double coating may be employed, but a single coat will generally give a satisfactory bond. The work may be cold pressed in the usual manner or may be hot pressed to secure quicker setting and immediate water-resistance. If the work is cold pressed, it will acquire water-resistance merely on storage at atmospheric temperatures, but the reaction in such case will proceed very slowly. If immediate water-resistance is desired, the work should be subjected to heat treatment during or after pressing. If cold pressed, the material may be baked for 8-10 hours at 75° C., or at higher or lower temperatures for correspondingly shorter or longer periods of time. The temperature for hot pressing or for heat treatment after pressing should generally not exceed 100° C. since higher temperatures tend to affect the protein adversely.

It will be apparent to those skilled in the art that the exact conditions for pressing and/or curing will depend upon the particular work at hand, the consistency of the adhesives, the amount applied, and the thickness of the layers being treated. However, in any case, the optimum conditions for carrying out these steps may readily be determined by simple preliminary experiments.

My adhesives may be employed for bonding practically any types of surfaces, such as paper to paper, wood to wood, wood to transite (asbestos-concrete), wood to metal, and the like. The adhesives are particularly adapted for use in the woodworking art and especially for the preparation of fine veneers. If alcoholic solutions of relatively pure zein and formaldehyde are employed, the products will not stain the finest wood. The adhesives may be employed with extremely thin faced veneers or fancy veneers with irregular grain structure and all species of wood may be treated without danger of discoloring. In this respect, these adhesives are markedly superior to casein glues or other glues containing alkali or having a natural staining property.

The following specific example will further serve to illustrate my invention: Purified zein, substantially free from oil and coloring matter, was dissolved in 2 parts by weight of 95% ethyl alcohol. Formaldehyde, in a concentration of approximately 20% on the weight of the zein, was added to this solution in the form of 0.5 part by weight of 40% aqueous formaldehyde solution. The resulting solution was found to be stable for 1-3 days' time and any gel formed was readily redissolved by vigorous agitation or by the addition of more alcohol; although in cases where the gelled material could be satisfactorily applied to the surface being treated, a good bond was still obtained without redissovling. The adhesive was employed in the usual manner for the production of ⅛ inch plywood and the sheets were held under pressure in clamps at atmospheric temperature for 12 hours. An extremely good bond was secured but the water resistance was relatively low. A sheet pressed for 9 hours at 75° C. was found to have excellent water resistance as well as an extremely good bond. At higher temperatures, a satisfactory bond may be obtained in much shorter times, e. g., 10 minutes at 100° C. For this operation, either at atmospheric temperatures or at elevated temperatures, a pressure of the order of 150 lbs. per sq. in. or higher will be found to be satisfactory.

If cold pressing is employed, the sheets being cemented together should be pressed while the adhesive is still tacky. Where, on the other hand, both heat and pressure are available, a satisfactory bond may still be obtained if the adhesive applied to one sheet has dried previous to pressing.

Although my invention has been illustrated by the above description and example, it is to be understood that it is not to be construed as limited to the particular materials or procedure specified. It will be apparent to those skilled in the art that various equivalent materials might successfully be employed. For example, alcohol-soluble proteins having, in general, the properties of zein, as for example gliadin, may be regarded as equivalents. Various other alcoholic solvents for zein such as methyl alcohol, carbitol, cellosolve, diacetone alcohol, ethylene chlorhydrin, and the like may be employed in place of ethyl alcohol. Likewise, other methylene compounds such as paraldehyde might be employed in place of free formaldehyde. Various modifying agents such as plasticizers or the like may be employed if desired. In general, it may be said that any equivalents or any modifications of procedure which would naturally occur to one skilled in the art may be employed without departing from the scope of my invention.

No claim is made herein to the subject matter of my earlier application, Serial No. 38,971, filed September 3, 1935, which discloses and claims the production of plastic substances through the reaction of formaldehyde and zein; this application being limited to zein-formaldehyde solutions used as adhesives or for like purposes.

My invention now having been described, what I claim is:

1. An adhesive comprising a 20-35% solution of zein in aqueous alcohol containing from 2-50% of formaldehyde, based on the weight of the zein.

2. An adhesive comprising a 20-35% solution of zein in aqueous alcohol containing from 15-25% of formaldehyde, based on the weight of the zein.

3. An adhesive comprising a zein solution of approximately 30% by weight in aqueous alcohol containing approximately 20% of formaldehyde, based on the weight of the zein.

OSWALD STURKEN.